US006563549B1

(12) United States Patent
Sethuraman

(10) Patent No.: US 6,563,549 B1
(45) Date of Patent: May 13, 2003

(54) METHOD AND APPARATUS FOR ADAPTIVELY ENCODING AN INFORMATION STREAM

(75) Inventor: Sriram Sethuraman, East Windsor, NJ (US)

(73) Assignee: Sarnoff Corporation, Princeton, NJ (US)

( * ) Notice: Subject to any disclaimer, the term of this patent is extended or adjusted under 35 U.S.C. 154(b) by 0 days.

(21) Appl. No.: 09/105,730

(22) Filed: Jun. 26, 1998

Related U.S. Application Data

(60) Provisional application No. 60/080,536, filed on Apr. 3, 1998.

(51) Int. Cl.[7] .................................................. H04N 7/12

(52) U.S. Cl. ........................ 348/700; 348/699; 382/236

(58) Field of Search ................................ 348/616, 700, 348/701, 699, 609, 415, 416, 409, 412, 404, 405; 382/218, 236; 370/498; 375/240.11, 240.14, 240.15

(56) References Cited

U.S. PATENT DOCUMENTS 5,212,549 A * 5/1993 Ng et al. .................... 348/409
5,247,363 A * 9/1993 Sun et al. .................. 348/616
5,404,174 A 4/1995 Sugahara .................... 348/700
5,565,920 A * 10/1996 Lee et al. .............. 375/240.11
5,617,150 A 4/1997 Nam et al. .................. 348/700
5,642,174 A * 6/1997 Kazui et al. ................ 348/701
5,732,146 A * 3/1998 Yamada et al. ............. 348/700
5,754,233 A 5/1998 Takashima .................. 348/390
5,768,539 A * 6/1998 Metz et al. ................. 709/249
5,832,121 A * 11/1998 Ando ......................... 348/700
5,917,830 A * 6/1999 Chen et al. ................. 370/487
5,978,029 A * 11/1999 Boice et al. ................ 348/412
6,337,879 B1 * 1/2002 Mihara et al. ............. 375/240

FOREIGN PATENT DOCUMENTS

EP 0 705 041 A 4/1996
EP 0 825 782 A 2/1998
WO 95/20863 8/1995
WO 97/31481 8/1997

OTHER PUBLICATIONS

International Search Report PCT/US 99/07408.

* cited by examiner

*Primary Examiner*—Gims S. Philippe
(74) *Attorney, Agent, or Firm*—William J. Burke

(57) ABSTRACT

A method and concomitant apparatus for adapting the behavior of an MPEG-like encoder to information discontinuities within a received information stream, such that encoding quality and random access to a resulting encoded stream is retained near information discontinuity point without adversely impacting buffer utilization parameters. Specifically, an anchor frame comprising an I-frame preceding an information discontinuity is encoded as a P-frame, while an anchor frame following the information discontinuity is encoded as an I-frame.

23 Claims, 6 Drawing Sheets

METHOD AND APPARATUS FOR ADAPTIVELY ENCODING AN INFORMATION STREAM

This application claims the benefit of U.S. Provisional Application No. 60/080,536, filed Apr. 3, 1998.

The invention relates to communications systems generally and, more particularly, the invention relates to a method and concomitant apparatus for adaptively encoding an information stream in response to indicia of an information stream discontinuity.

BACKGROUND OF THE DISCLOSURE

In several communications systems the data to be transmitted is compressed so that the available bandwidth is used more efficiently. For example, the Moving Pictures Experts Group (MPEG) has promulgated several standards relating to digital data delivery systems. The first, known as MPEG-1 refers to ISO/IEC standards 11172 and is incorporated herein by reference. The second, known as. MPEG-2, refers to ISO/IEC standards 13818 and is incorporated herein by reference. A compressed digital video system is described in the Advanced Television Systems Committee (ATSC) digital television standard document A/53, and is incorporated herein by reference.

The above-referenced standards describe data processing and manipulation techniques that are well suited to the compression and delivery of video, audio and other information using fixed or variable length digital communications systems. In particular, the above-referenced standards, and other "MPEG-like" standards and techniques, compress, illustratively, video information using intra-frame coding techniques (such as run-length coding, Huffman coding and the like) and inter-frame coding techniques (such as forward and backward predictive coding, motion compensation and the like). Specifically, in the case of video processing systems, MPEG and MPEG-like video processing systems are characterized by prediction-based compression encoding of video frames with or without intra- and/or inter-frame motion compensation encoding.

In a typical MPEG encoder, a received video stream comprising a plurality of video frames is encoded according to a predefined group of pictures (GOP) structure. That is, the received video stream is encoded to produce a GOP comprising, e.g., an intra-coded frame (I-frame), followed by one or more forward predicted coded frames (P-frames) and bi-directional (i.e., forward and backward) predicted frames (B-frames). In the case of a scene change in the received video stream, the first frame of the new scene may be significantly different than the previous anchor frame. Thus, the encoder may need to intra-code a very large percentage of the macroblocks in the first frame. In this situation, encoders typically encode the frame as an anchor frame, from which subsequent frames within the predefined GOP structure will be predicted.

Unfortunately, if the new anchor frame was targeted to be coded as a P-frame, its intra-coding impacts the rate control (RC) predictions utilized by the encoder. Depending on how RC is done, this can affect the coded quality of the P-frame itself and the quality over the few frames that are encoded after the P-frame. In particular, the effect is felt the most when the previous anchor frame was an I-frame.

In addition, unless the first anchor frame after a scene change is declared an I-frame, rather than a P-frame with most or all of its macroblocks intra-coded, random access (i.e., independent decodability) is not gained near the start of the scene change. Thus, to retain random access, some encoders simply code the first frame after a scene change as an I-frame, whether it was scheduled to be a P-frame or a B-frame. Such encoder behavior also impact the RC behavior of the encoder.

Therefore, it is seen to be desirable to address the above-described problems by providing a method and concomitant apparatus for adapting the behavior of an MPEG-like encoder to scene changes within a received video stream such that encoding quality and random access to the encoded stream is retained near scene change points. More generally, it is seen to be desirable to provide a method and concomitant apparatus for adapting the behavior of an MPEG-like encoder to information discontinuities within a received information stream of any type, such that encoding quality and random access to the encoded stream is retained near information discontinuity points.

SUMMARY OF THE INVENTION

The invention comprises a method and concomitant apparatus for adapting the behavior of an MPEG-like encoder to information discontinuities within a received information stream, such that encoding quality and random access to a resulting encoded stream is retained near information discontinuity point without adversely impacting buffer utilization parameters. Specifically, an anchor frame comprising an I-frame preceding an information discontinuity is encoded as a P-frame, while an anchor frame following the information discontinuity is encoded as an I-frame.

Specifically, in a system compression coding a sequence of unencoded information frames to produce a sequence of encoded information frames substantially in accordance with a group of frames (GOF) information structure, each GOF comprising at least one sub-GOF, each sub-GOF comprising at least anchor frame, each anchor frame comprising one of an intra-coded frame (I-frame) and a forward predicted frame (P-frame), a method according to the invention comprises the step of adapting, in response to an inter-frame information discontinuity within the sequence of unencoded information frames, the GOF information structure such that a first anchor frame following the information discontinuity comprises an I-frame, and a first anchor frame preceding the information discontinuity comprises a P-frame.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

The invention will be described within the context of an MPEG-like encoding system that encodes an input information stream IN to produce an encoded output information stream OUT that nominally conforms to a group of frames (GOF) or group of pictures (GOP) data structure. Each GOF/GOP data structure comprises N frames arranged as a plurality of sub-GOF or sub-GOP data structures having a maximal size of M frames. Each sub-GOF/GOP comprise a respective anchor frame (e.g., an I-frame or a P-frame) and, optionally, one or more non-anchor frames (e.g., B-frames). In response to an inter-frame information discontinuity within the input information stream IN, the invention adapts the encoded output information stream such that the first anchor frame following the information discontinuity comprises an I-frame, while the first anchor frame preceding the information discontinuity comprises a P-frame.

Figure 1:
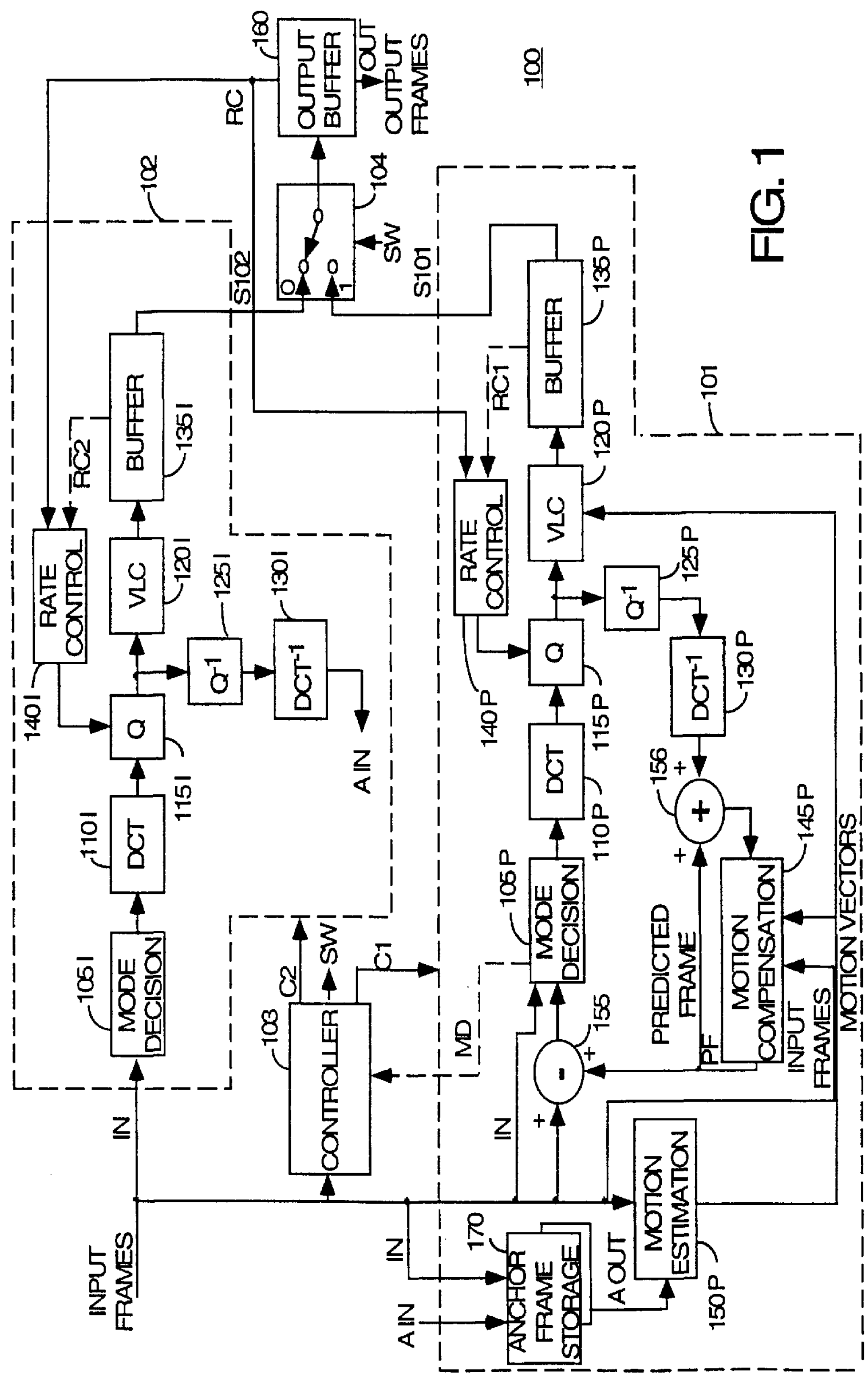
FIG. 1 depicts an MPEG-like encoding system 100 according to the invention.

FIG. 1 depicts an MPEG-like encoding system 100 according to the invention. Specifically, FIG. 1 depicts an MPEG-like encoding system 100 comprising a first encoding module 101, a second encoding module 102, a controller 103, a selector 104 and an output buffer 160. The MPEG-like encoding system 100 receives and encodes an input information stream IN comprising a plurality of uncompressed information frames, illustratively a sequence of images forming a video information stream, to produce an encoded output information stream OUT.

First encoding module 101 receives and encodes the input information stream IN to produce a first encoded information stream S101 that partially conforms to a group of frames (GOF) or group of pictures (GOP) data structure. The first encoded information stream S101 only partially conforms to the GOF or GOP data structure because the first encoding module 101 encodes every anchor frame as a forward predicted coded frame (P-frame), even if the frame was scheduled, per the GOF/GOP data structure, to be an intra-coded frame (I-frame). Thus, first encoded information stream S101 includes sub-GOFs or sub-GOPs having P-frames as anchor frames. The first encoded information stream S101 is buffered in a sub-GOF/GOP buffer and then coupled to a first input of selector 104.

Second encoding module 102 receives and encodes the input information stream IN to produce a second encoded information stream S102 comprising only intra-coded anchor frames. Specifically, the second encoding module 102 encodes every anchor frame as an intra-coded frame (I-frame), even if the frame was scheduled, per the GOF/GOP data structure utilized by the first encoding module 101, to be a P-frame. Such a frame is denoted as dual-coded frame, since it is encoded as an I-frame by the second encoding module 102 and as a P-frame by the first encoding module 101. Thus, second encoded information stream S102 includes only intra-coded anchor frames. The second encoded information stream S102 is buffered in a sub-GOF/GOP buffer and then coupled to a second input of selector 104. Additionally, each frame encoded by second encoder 102 is reconstructed (i.e., decoded) to provide a reference anchor frame suitable for use in a motion prediction portion of the first encoding module 101, as will be discussed below.

Output buffer 160 produces a rate control signal RC indicative of a buffer utilization level of a far end decoder buffer. The rate control signal RC is coupled to the first encoding module 101 and the second encoding module 102. The encoding modules utilize the rate control signal to adapt quantization parameters of their respective encoding processes, such that the bit rate of their respective output signals S101 and S102 may be controlled, thereby avoiding buffer overflow or underflow in a far end decoder buffer.

Controller 103 is coupled to a control input of the selector 104 and also produces a first encoder control signal C1 and a second encoder control signal C2 for controlling, respectively, first encoding module 101 and second encoding module 102. The controller 103 normally operates in a continuous mode of operation, wherein the information steam provided to the output buffer conforms to a defined GOF/GOP data structure. To prevent, e.g., the occurrence of consecutive I-frame type anchor frames in that provided information stream, the controller 103 enters a discontinuous mode of operation in the event of, e.g., a scene change or other information stream discontinuity. In the discontinuous mode of operation, the controller 103 changes the first (temporally) anchor frame from an I-frame to a P-frame. This is possible because each anchor frame is dual coded as both an I-frame and a P-frame, as previously mentioned. To detect such an information discontinuity, the controller 103 receives at least one of the input information stream IN and a mode decision indication signal MD from the second encoding module 102. The detection of an information discontinuity will be described below. Briefly, where more than a threshold number of macroblocks are selected for intra-coding (rather then inter-coding or predictive coding), the present information frame being encoded is inherently sufficiently different from an anchor frame from which predictions are based to conclude that an information discontinuity, such as a scene change, has occurred.

First encoding module 101 comprises an adder 155, a mode decision module 105P, a discrete cosine transform (DCT) module 110P, a quantizer (Q) module 115P, a variable length coding (VLC) module 120P, an inverse quantizer ($Q^{-1}$) 125P, an inverse discrete cosine transform ($DCT^{-1}$) module 130P, a subtractor 156, a buffer 135P, a rate control module 140P, a motion compensation module 145P, a motion estimation module 150P and an anchor frame storage module 170. Although the second encoding module 102 comprises a plurality of modules, those skilled in the art will realize that the functions performed by the various modules are not required to be isolated into separate modules as shown in FIG. 1. For example, the set of modules comprising the motion compensation module 145P, inverse quantization module 125P and inverse DCT module 130P is generally known as an "embedded decoder."

In the case of the input information stream IN comprising a video information stream, the video information stream represents a sequence of images on the input signal path IN which is digitized and represented as, illustratively a luminance and two color difference signals (Y, $C_r$, $C_b$) in accordance with the MPEG standards. These signals are further divided into a plurality of layers (sequence, group of pictures, picture, slice, macroblock and block) such that each picture (frame) is represented by a plurality of macroblocks. Each macroblock comprises four (4) luminance blocks, one $C_r$ block and one $C_b$ block where a block is defined as an eight (8) by eight (8) sample array. The division of a picture into block units improves the ability to discern changes between two successive pictures and improves image compression through the elimination of low amplitude transformed coefficients (discussed below). The digitized signal may optionally undergo preprocessing such as format conversion for selecting an appropriate window, resolution and input format.

Subtractor 155 generates a residual signal (also referred to in the art as simply the residual or the residual macroblock) by subtracting a predicted macroblock on the signal path PF from an input macroblock on the signal path IN.

The mode decision module 105P receives the residual macroblock (i.e., the predicted macroblock) from the subtractor 155 and the input macroblock from the signal path IN. If the predicted macroblock is substantially similar to the input macroblock (i.e., the residuals are relatively small and are easily coded using very few bits), then the mode decision module 105P selects the residual signal from the subtractor 155 for inter-coding. That is, the macroblock will be encoded as a motion compensated macroblock, i.e., motion vector(s) and associated residual(s). However, if the difference between the predicted macroblock and the input macroblock is substantial, the residuals are difficult to code. Consequently, the system operates more efficiently by directly coding the input macroblock rather than coding the motion compensated residual macroblock.

The above selection process is known as a selection of the coding mode. Coding the input macroblock is referred to as intra-coding, while coding the residuals is referred to as inter-coding. The selection between these two modes is known as the Intra-Inter-Decision (IID). The IID is typically computed by first computing the variance of the residual macroblock (Var R) and the variance of the input macroblock (Var I). The coding decision is based on these values. There are several functions that can be used to make this decision. For example, using the simplest function, if Var R is less than Var I, the IID selects the Inter-mode. Conversely, if Var I is less than Var R, the IID selects the Intra-mode.

Optionally, the mode decision module 105P provides an output signal MD indicative of the presence or absence of an information stream discontinuity. For example, in one embodiment of the invention the output signal MD indicates the number of macroblocks within a particular information frame that have been selected, by the IID process, as intra-coded macroblocks. A large number of intra-coded macroblocks within a particular information frame indicates that the information frame is substantially different from a preceding information frame. Such a substantial difference may be due to an information discontinuity, such as a scene cut or scene change in an input video information stream. The controller may be conditioned to interpret excursions beyond a predefined number of intra-coded macroblocks within one frame as indicative of a scene cut. The operation of the controller will be described in more detail below with respect to FIGS. 2 and 3.

The selected block (i.e., input macroblock or residual macroblock) is then coupled to the discrete cosine transform (DCT) module 110P. The DCT module 110P applies a discrete cosine transform process to each block of the received macroblock to produce a set of, illustratively, eight (8) by eight (8) blocks of DCT coefficients. The DCT basis function or subband decomposition permits effective use of psychovisual criteria which is important for the next step of quantization. It should be noted that while the DCT module may be adapted to process any size block or macroblock, though the eight by eight block size is commonly used in MPEG-like compression systems. The DCT coefficients produced by the DCT module 110P are coupled to the quantizer module 115P.

The quantizer module 115P quantizes the received DCT coefficients to produce a quantized output block. The process of quantization reduces the accuracy with which the DCT coefficients are represented by dividing the DCT coefficients by a set of quantization values with appropriate rounding to form integer values. The quantization values can be set individually for each DCT coefficient, using criteria based on the visibility of the basis functions (known as visually weighted quantization). Namely, the quantization value corresponds to the threshold for visibility of a given basis function, i.e., the coefficient amplitude that is just detectable by the human eye. By quantizing the DCT coefficients with this value, many of the DCT coefficients are converted to the value "zero", thereby improving image compression efficiency. The process of quantization is a key operation and is an important tool to achieve visual quality and to control the encoder to match its output to a given bit rate (rate control). Since a different quantization value can be applied to each DCT coefficient, a "quantization matrix" is generally established as a reference table, e.g., a luminance quantization table or a chrominance quantization table. Thus, the encoder chooses a quantization matrix that determines how each frequency coefficient in the transformed block is quantized.

The rate control module 140P controls the quantization scale (step size) used to quantize the DCT coefficients and/or controls the number of DCT coefficients that are coded by the system in response to a rate control signal RC produced by the output buffer 160. The rate control signal RC produced by the output buffer 160 indicates a utilization level of the output buffer 160. The primary task of the rate control module 140P is to manage the fullness or utilization level of the output buffer 160, from which a constant output bit rate is provided to a transmission channel. The constant bit rate must be maintained even though the encoding rate may vary significantly, depending on the content of each image and the sequence of images.

The rate control module 140P adjusts the output bit rate of the first encoding module 101 by selecting a quantizer scale for each frame in a manner maintaining the overall quality of the video image while controlling the coding rate. Namely, a quantizer scale is selected for each frame such that target bit rate for the picture is achieved while maintaining a uniform visual quality over the entire sequence of pictures. In this manner, the rate control module 140P operates to prevent buffer overflow and underflow conditions on the decoder side (e.g., within a receiver or target storage device, not shown) after transmission of the output information stream OUT.

Optionally, the rate control module 140P is responsive to a rate control signal RC1 indicative of a utilization level of the buffer 135P. As previously noted, the buffer 135P is used to hold, e.g., at least one encoded sub-GOF/GOP comprising an anchor frame (i.e., an I-frame or a P-frame) and a plurality of non-anchor frames (i.e., B-frames) according to the GOF/GOP data structure. Therefore, if the capacity of the buffer 135P is limited, then the rate control module 140P must ensure that the buffer 135P does not overflow.

Another important task of the rate control module 140P is to insure that the bit stream produced by the encoder does not overflow or underflow a decoder's input buffer. Overflow and underflow control is accomplished by maintaining and monitoring a virtual buffer within the encoder. This virtual buffer is known as the video buffering verifier (VBV). To ensure proper decoder input buffer bit control, the encoder's rate control process establishes for each picture, and also for each macroblock of pixels comprising each picture, a bit quota (also referred to herein as a bit budget). By coding the blocks and the overall picture using respective numbers of bits that are within the respective bit budgets, the VBV does not overflow or underflow. Since the VBV mirrors the operation of the decoder's input buffer, if the VBV does not underflow or overflow, then the decoder's input buffer will not underflow or overflow.

To accomplish such buffer control, the rate controller makes the standard assumption in video coding that the current picture looks somewhat similar to the previous picture. If this assumption is true, the blocks of pixels in the picture are motion compensated by the coding technique and, once compensated, require very few bits to encode. This method works very well, as long as the actual number of bits needed to code the picture is near the target number of bits assigned to the picture, i.e., that the number of bits actually used is within the bit quota for that picture.

The quantized DCT coefficients (e.g., an 8×8 block of quantized DCT coefficients) produced by the quantizing module 115P are coupled to the variable length coding (VLC) module, where the two-dimensional block of quantized coefficients is scanned in a "zigzag" order to convert it into a one-dimensional string of quantized DCT coefficients. This zigzag scanning order is an approximate sequential ordering of the DCT coefficients from the lowest spatial frequency to the highest. Variable length coding (VLC) module 120 then encodes the string of quantized DCT coefficients and all side-information for the macroblock using variable length coding and run-length coding.

To perform motion prediction and compensation, the first encoding module 101 regenerates encoded anchor frames for use a reference frames. Specifically, the quantized DCT coefficients (e.g., an 8×8 block of quantized DCT coefficients) produced by the quantizing module 115P are coupled to the inverse quantizing ($Q^{-1}$) module 125P, where an inverse quantizing process is performed on each macroblock. The resulting dequantized DCT coefficients (e.g., an 8×8 block of dequantized DCT coefficients) are passed to the inverse DCT ($DCT^{-1}$) module 130P, where an inverse DCT process is performed on each macroblock to produce a decoded error signal. The error signal produced by the $DCT^{-1}$ module 130P is coupled to an input of adder 156.

Motion estimation module 150P receives the input information stream IN and a stored anchor frame information stream AOUT. The stored anchor frame information stream AOUT is provided by the anchor frame storage module 170, which stores an input anchor frame information stream AIN that is provided by the second encoding module 101, and will be discussed in more detail below. Briefly, the stored anchor frame information stream AOUT represents a decoded version of the intra-coded first anchor frame of a GOF or GOP presently being encoded by the second encoding module 102 (and first encoding module 101).

The motion estimation module 150P estimates motion vectors using the input information stream IN and the stored anchor frame information stream AOUT. A motion vector is a two-dimensional vector which is used by motion compensation to provide an offset from the coordinate position of a block in the current picture to the coordinates in a reference frame. The reference frames can be forward predicted coded frames (P-frames) or bidirectional (i.e., forward and backward) predicted frames (B-frames). The use of motion vectors greatly enhances image compression by reducing the amount of information that is transmitted on a channel because only the changes between the current and reference frames are coded and transmitted. The motion vectors are coupled to the motion compensation module 145P and the VLC module 120P.

The motion compensation module 145P utilizes the received motion vectors to improve the efficiency of the prediction of sample values. Motion compensation involves a prediction that uses motion vectors to provide offsets into the past and/or future reference frames containing previously decoded sample values that are used to form the prediction error. Namely, the motion compensation module 150P uses the previously decoded frame and the motion vectors to construct an estimate of the current frame. Furthermore, those skilled in the art will realize that the functions performed by the motion estimation module and the motion compensation module can be implemented in a combined module, e.g., a single block motion compensator.

Prior to performing motion compensation prediction for a given macroblock, a coding mode must be selected. In the area of coding mode decision, the MPEG and MPEG-like standards provide a plurality of different macroblock coding modes. Specifically, MPEG-2 provides macroblock coding modes which include intra mode, no motion compensation mode (No MC), frame/field/dual-prime motion compensation inter mode, forward/backward/average inter mode and field/frame DCT mode.

Once a coding mode is selected, motion compensation module 145P generates a motion compensated prediction frame (e.g., a predicted image) on path PF of the contents of the block based on past and/or future reference pictures. This motion compensated prediction frame on path PF is subtracted, via subtractor 155, from the input information frame IN (e.g., a video image) in the current macroblock to form an error signal or predictive residual signal. The formation of the predictive residual signal effectively removes redundant information in the input video image. As previously discussed, the predictive residual signal is coupled to the mode decision module 105P for further processing.

The VLC data stream produced by the VLC encoder 120P is received into the buffer 135P, illustratively a "First In-First Out" (FIFO) buffer capable of holding at least one encoded sub-GOF/GOP according to the GOF/GOP data structure. The VLC data stream stored in buffer 135P is selectively coupled, via selector 104, to the output buffer 160, illustratively a FIFO buffer.

A consequence of using different picture types and variable length coding is that the overall bit rate into the output buffer 160 is variable. Namely, the number of bits used to code each frame can be different. In applications that involve a fixed-rate channel for coupling the output information stream OUT to, e.g., a storage medium or telecommunication channel, the output buffer 160 is used to match the encoder output to the channel for smoothing the bit rate. Thus, the output signal OUT of FIFO buffer 160 is a compressed representation of the input information stream IN.

Second encoding module 102 comprises a discrete cosine transform (DCT) module 110I, a quantizer (Q) module 115I, a variable length coding (VLC) module 120I, an inverse quantizer ($Q^{-1}$) module, an inverse discrete cosine transform ($DCT^{-1}$) module 130I, a buffer 135I and a rate control module 140I. The various modules included within the second encoding module 102 are connected together and operate in substantially the same manner as previously described with respect to the first encoding module 101. As such, only differences between the two encoding modules will be discussed in detail. The primary difference between the two encoding modules is that the second encoding module 102 only encodes those input information frames scheduled, per the GOF/GOP data structure, to be encoded as anchor frames. By contrast, the first encoding module 101 encodes all the input information frames per the GOF/GOP data structure.

The controller 103 causes the MPEG-like encoder depicted in FIG. 1 to operate in one of several operating modes, namely a continuous operating mode and a discontinuous operating mode. The controller 103 normally operates in a continuous mode of operation, wherein the information steam provided to the output buffer conforms to a defined GOF/GOP data structure. To prevent, e.g., the occurrence of consecutive I-frame type anchor frames in that provided information stream, the controller 103 enters a discontinuous mode of operation in the event of, e.g., a scene change or other information stream discontinuity. In the discontinuous mode of operation, the controller 103 changes the first (temporally) anchor frame from an I-frame to a P-frame. This is possible because each anchor frame is dual coded as both an I-frame and a P-frame, as previously described. The operation of the controller 103 will be described in more detail below with respect to Table 1 and FIG. 2.

The discontinuous mode of operation is entered when the controller 103 determines that an information discontinuity within the input information stream IN has occurred, e.g., a scene change or "scene cut" within an input video stream. In the continuous mode of operation, controller 103 adapts selector 104 such that the first encoder output stream S101 and second encoder output stream S102 are selected in a manner producing, at the output of switch 104, an information stream conforming to the GOF/GOP data structure. Specifically, the controller 103 causes switch 104 to select, as the first frame in a GOF or GOP being formed, the I-frame within the second encoder output stream S102 associated with first frame of the GOF or GOP. That is, the I-frame version of the dual coded frame is selected. The controller 103 then causes selector 104 to select, as the remaining frames in the GOF or GOP being formed, the anchor frames and non-anchor frames associated with the remaining frames of the GOF or GOP. This process is repeated for each GOF or GOP until the controller 103 enters the discontinuous mode of operation.

In the discontinuous mode of operation, the controller 103 determines if the discontinuity has occurred within one sub-GOF/GOP from the start of a new GOF or GOP information structure. If this is not the case (i.e., the previous anchor frame was a P-frame and, hence, not the first frame of a new sub-GOF/GOP), then the controller 103 starts a new sub-GOF/GOP by encoding the anchor frame after the information discontinuity as an I-frame. However, if the discontinuity occurs within one sub-GOF/GOP of the scheduled I-frame, the controller 103 causes selector 104 to select the P-frame version of the dual-encoded previous anchor frame along with the associated non-anchor frames (i.e., the B-frames of the sub-GOF/GOP) The controller 103 then causes selector 104 to select the I-frame version of the dual encoded anchor frame immediately after the information disc continuity. In effect, the scheduled first sub-GOF/GOP of a new GOF/GOP is made the last sub-GOF/GOP of the previous GOF/GOP information structure and a new GOF/GOP information structure is started with the anchor frame after discontinuity as its first frame.

Table 1 depicts information useful in understanding the invention. The first row of table 1 identifies a frame number (i.e., 1–18) associated with each of a plurality of input information frames, illustratively video frames, provided to the invention. The second row of table 1 depicts a scene number (i.e., 1–2) associated with each of the input video frames of the first row. It is important to note that the scene number of transitions from scene 1 to scene 2 after the 11th frame.

The third row of table 1 depicts a desired GOF/GOP data structure used to encode the video input frames (i.e., IBBPBBPBB . . . ). The desired GOF/GOP data structure is the structure intended to be imparted to the output information stream OUT provided by the output buffer 160 to, e.g., a transmission channel. It must be noted that the exemplary GOF/GOP data structure depicted in Table 1 is for illustrative purposes only, the invention may be practiced using any GOF/GOP data structure.

The fourth row depicts the output information stream S101 of the first encoding module 101 of the MPEG-like encoder depicted in FIG. 1. As previously discussed, the first encoding module 101 receives and encodes the input information stream IN to produce a first encoded information stream S101 that partially conforms to a group of frames (GOF) or group of pictures (GOP) data structure, illustratively the GOF/GOP data structure depicted in the third row of Table 1. The first encoded information stream S101 only partially conforms to the GOF or GOP data structure because the first encoding module 101 encodes every anchor frame as a P-frame, even if the frame was scheduled, per the GOF/GOP data structure, to be an I-frame. Thus, first encoded information stream S101 includes sub-GOFs or sub-GOPs having P-frames as anchor frames.

The fifth row depicts the output information stream S102 of the second encoding module 102 of the MPEG-like encoder depicted in FIG. 1. As previously discussed, the second encoding module 102 receives and encodes the input information stream IN to produce a second encoded information stream S102 comprising only intra-coded anchor frames. Specifically, the second encoding module 102 encodes every anchor frame as an intra-coded frame (I-frame), even if the frame was scheduled, per the GOF/GOP data structure utilized by the first encoding module 101, to be a P-frame. Thus, second encoded information stream S102 includes only intra-coded anchor frames.

The sixth row depicts an output information stream OUT provided by the output buffer 160 of the of the MPEG-like encoder depicted in FIG. 1. Specifically, the sixth row depicts the adaptation made to the GOF/GOP data structure in response to a change from a first scene (frame 11) and a second scene (frame 12). Referring to the GOF/GOP structure defined in the third row, frame 13 is scheduled to be encoded as a P-frame. However, since a new scene started at

TABLE 1

| FRAME | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|
| SCENE | 1 | 1 | 1 | 1 | 1 | 1 | 1 | 1 | 1 | 1 | 1 | 2 | 2 | 2 | 2 | 2 | 2 | 2 |
| GOF/GOP | I | B | B | P | B | B | P | B | B | I | B | B | P | B | B | P | B | B |
| S101 | P | B | B | P | B | B | P | B | B | P | B | B | P | B | B | P | B | B |
| S102 | I | | | I | | | I | | | I | | | I | | | I | | |
| Output1 | I | B | B | P | B | B | P | B | B | P | B | B | I | B | B | P | B | B |
| Output2 | I | B | B | P | B | B | P | B | B | P | B | I | B | B | P | B | B | P |

frame 12, the first anchor frame of the first sub-GOF/GOP following the scene change will be encoded as an I-frame. Since frame 10 (a dual coded anchor frame) is already scheduled to be an I-frame, the controller causes the P-frame version of frame 10 to be selected for output, while the I-frame version of frame 13 is selected for output. In this manner, the undesirable situation of outputting two closely proximate I-frames (i.e., frames 10 and 13) is avoided.

The seventh row depicts an alternate output information stream OUT provided by the output buffer 160 of the of the MPEG-like encoder depicted in FIG. 1. Specifically, the sixth row depicts the adaptation made to the GOF/GOP data structure in response to a change from a first scene (frame 11) and a second scene (frame 12), where the first frame of the new scene (i.e., frame 12) is encoded as an I-frame, rather than the first anchor frame (i.e., frame 13) of the new scene as depicted in row 6.

Figure 2:
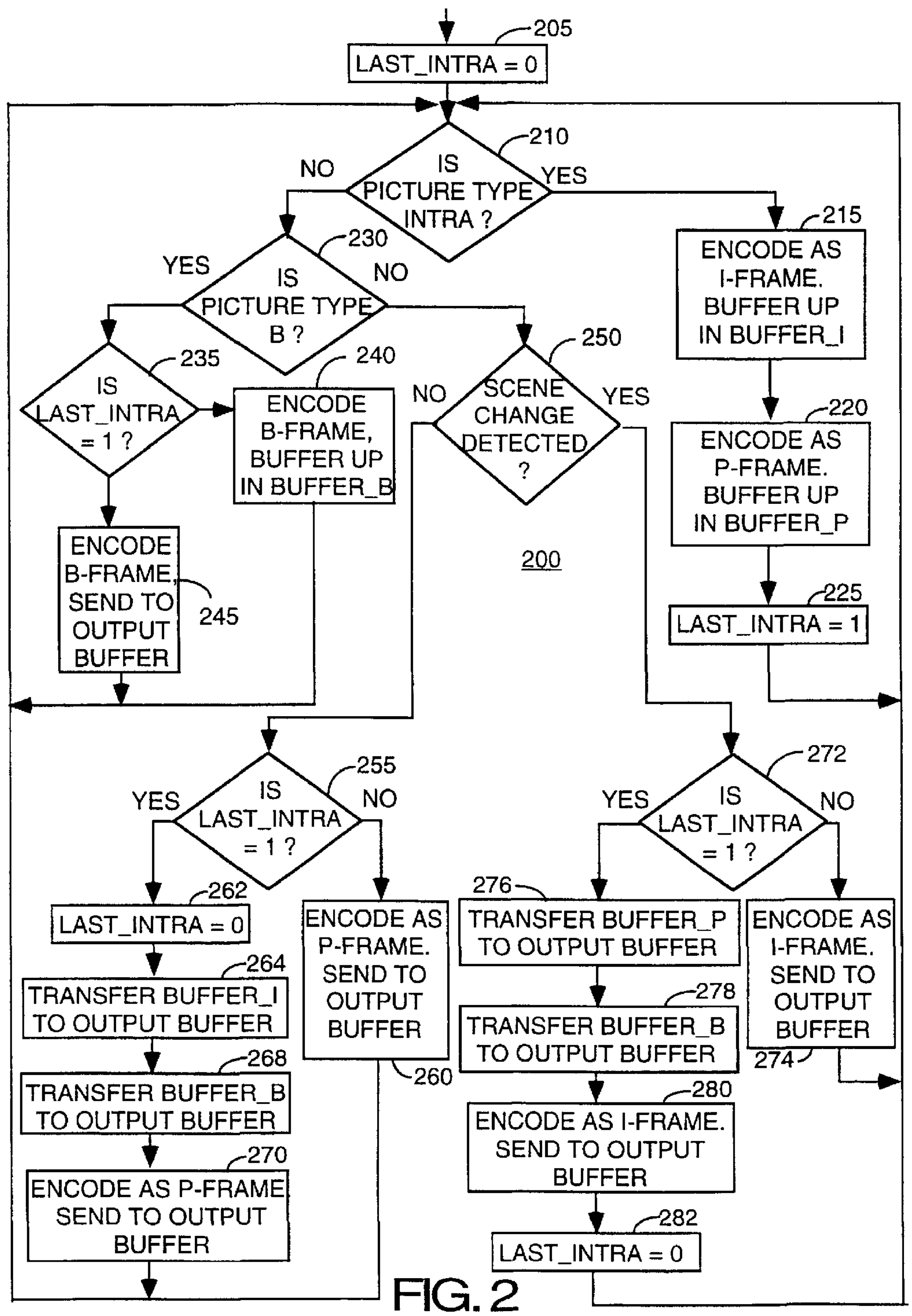
FIG. 2 depicts a flow diagram of an adaptive frame switching routine 200 suitable for use in the MPEG-like encoder depicted in FIG. 1.

FIG. 2 depicts a flow diagram of an adaptive frame switching routine 200 suitable for use in the MPEG-like encoder depicted in FIG. 1. Specifically, the routine 200 of FIG. 2 may be implemented as a control routine within the controller 103, or as a logical function between cooperating modules of the MPEG-like encoder 100 of FIG. 1. The routine 200 provides adaptive fame switching within the context of an encoding system simultaneously encoding anchor frames as both I-frames and P-frames (i.e., dual coded frames).

The routine 200 of FIG. 2 is entered at step 205, where a variable LAST_INTRA is set equal to 0. The routine 200 then proceeds to step 210, where the query is made as to whether a received input information frame to be encoded is scheduled (per the GOF/GOP data structure) to be encoded as an I-frame. If the query at step 210 is answered affirmatively, then the routine 200 proceeds to step 215.

At step 215 the received frame is encoded as an I-frame, and the encoded I-frame is stored in a first buffer (i.e., BUFFER_I). The routine 200 then proceeds to step 220, where the received frame is encoded as a P-frame, and the encoded P-frame is stored in a second buffer (i.e., BUFFER_P). The routine 200 then proceeds to step 225, where the LAST_INTRA variable is set equal to 1. The routine 200 then proceeds to step 210.

If the query at step 210 is answered negatively, then the routine 200 proceeds to step 230. At step 230 a query is made as to whether the received frame is scheduled to be encoded as a B-frame. If the query at step 230 is answered affirmatively, then the routine 200 proceeds to step 235, where a query is made as to whether the LAST-INTRA variable is equal to 1. If the query at step 235 is answered affirmatively, then the routine 200 proceeds to step 240, where the received frame is encoded as a B-frame, and the encoded B-frame is stored in a third buffer (i.e., BUFFER_B). The routine 200 then proceeds to step 210. If the query at step 235 is answered negatively, then the routine 200 proceeds to step 245, where the received frame is encoded as a B-frame, and the encoded B-frame is sent to an output buffer. The routine 200 then proceeds to step 210.

It should be noted that the first buffer (i.e., BUFER_I), the second buffer (i.e., BUFFER_P) and the third buffer (i.e., BUFFER_B) may comprise unique memory modules, portions of the same memory module, internal memory of, e.g., controller 103 or any other available memory, including a portion of an encoder output buffer. The location of the various memory locations does not impact the practice of the invention, since one skilled in the art and informed by the teachings of this disclosure will readily devise modifications to the invention suitable for a variety of memory configurations.

If the query at step 230 is answered negatively, then the routine 200 proceeds to step 250, where a query is made as to whether an information discontinuity (e.g., a scene change in a video input stream) has been detected. If the query in step 250 is answered affirmatively, then the routine 200 proceeds to step 272, where a query is made as to whether the LAST_INTRA variable is set equal to 1. If the query at step 272 is answered negatively, then the routine 200 proceeds to step 274, where the received frame is encoded as an I-frame, and the encoded I-frame is sent to the output buffer. The routine 200 then proceeds to step 210.

If the query at step 272 is answered affirmatively, then the routine 200 proceeds to step 276, where the contents of the second buffer (i.e., BUFFER_P) are transferred to the output buffer. The routine 200 then proceeds to step 278, where the contents of the third buffer (e.g., BUFFER_B) are transferred to the output buffer, and to step 280, where the received frame is encoded as an I-frame, and the encoded I-frame is sent to the output buffer. The routine 200 then proceeds to step 282, where the LAST_INTRA variable is set equal to 0. The routine 200 then proceeds to step 210.

If the query at step 250 is answered negatively, then the routine 200 proceeds to step 255, where a query is made as to whether the LAST_INTRA variable is set equal to 1. If the query at step 255 is answered negatively, then the routine 200 proceeds to step 260, where the received frame is encoded as a P-frame, and the encoded P-frame is sent to the output buffer. The routine 200 then proceeds to step 210.

If the query at step 255 is answered affirmatively, then the routine 200 proceeds to step 262, where the LAST_INTRA variable is set equal to 0. The routine 200 then proceeds to step 264, where the contents of the first buffer (i.e., BUFFER_I) are transferred to the output buffer, and to step 268, where the contents of the third buffer (i.e., BUFFER_B) are transferred to the output buffer. The routine 200 then proceeds to step 270, where the received frame is encoded as a P-frame, and the encoded P-frame is sent to the output buffer. The routine 200 then proceeds to step 210.

The above-described flow routine depicts an exemplary embodiment of a method according to the invention. Specifically, the above described routine depicts the concurrent encoding of a received anchor frame as both an I-frame and a P-frame. It is important to note that the first, second, third and output buffers are only used to store encoded (i.e., compressed) information frames. Thus, the memory requirements of the system are reduced at the cost of increased processing requirements. The inventor has determined that the added processing cost of such a system (e.g., the addition of a second encoding module) may be more than offset by an associated decrease in memory expense.

In the above-described embodiment of the invention the second encoding module 102 encodes every anchor frame as an I-frame. It must be noted that the second encoding module 102 may also be controlled to encode as I-frames only those frames that are scheduled, per the GOF/GOP data structure, to be encoded as P-frames. That is, in another embodiment of the invention the first encoding module 101 encodes input frames as I-frames, P-frames and B-frames in accordance with the GOF/GOP data structure. Contemporaneously, the second encoding module 102 encodes as I-frames only those frames scheduled, per the GOF/GOP data structure, to be encoded as P-frames.

In this alternate embodiment of the invention, the controller 103 in substantially the same manner as previously described, except that during the continuous mode of operation the controller 103 only causes the output stream S101 of the first encoding module to be coupled to the output buffer 160. This is because the output stream S101 of the first encoding module 101 is properly encoded per the GOF/GOP data structure. In the discontinuous mode of operation, the controller 103 couples the output stream S102 of the second encoding module 102 to the output buffer 160 when a P-frame within the first encoding module output stream S101 must be replaced by an I-frame.

Figure 3:
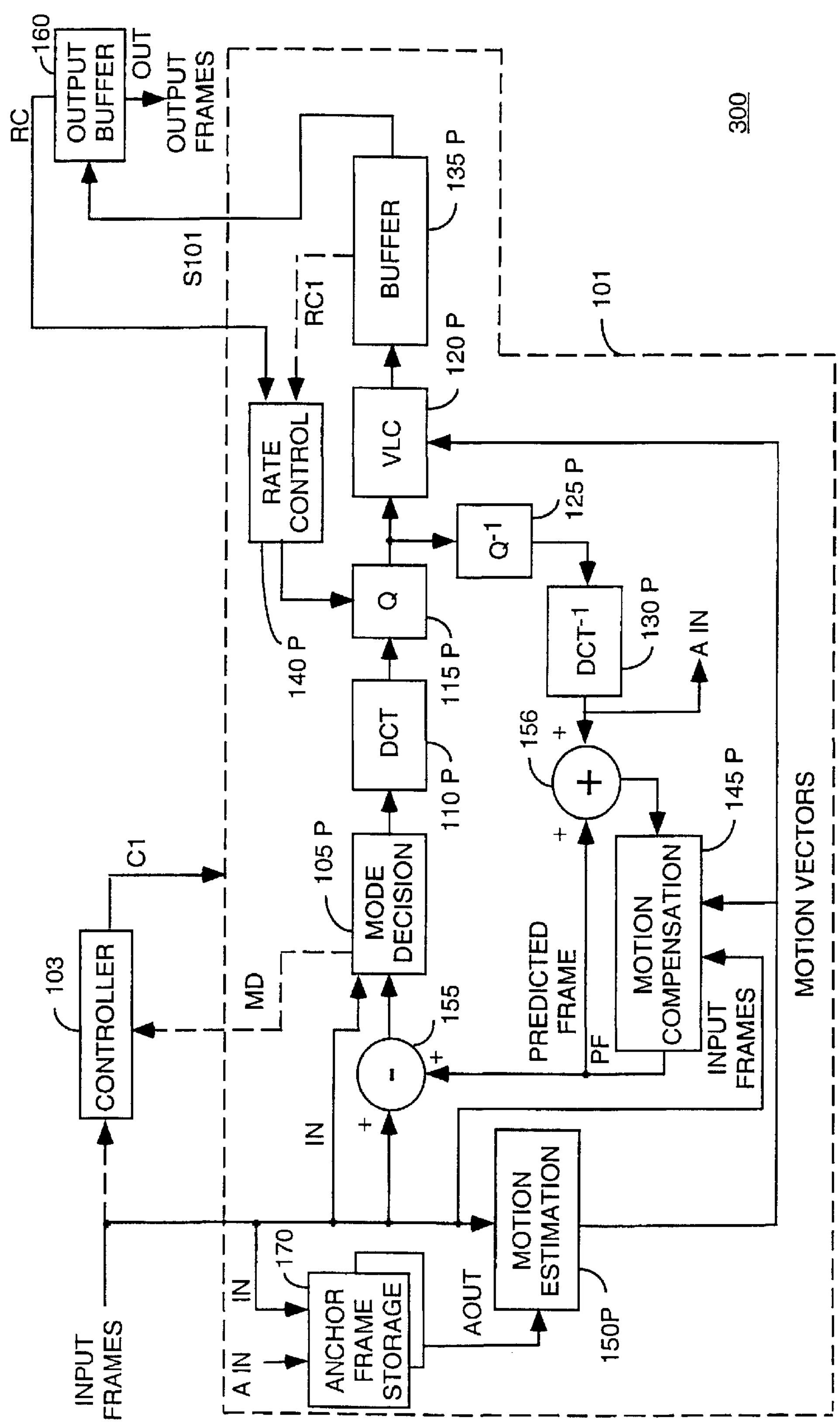
FIG. 3 depicts an embodiment of an MPEG-like encoding system 100 according to the invention.

FIG. 3 depicts an embodiment of an MPEG-like encoding system 300 according to the invention. Specifically, FIG. 3 depicts an MPEG-like encoding system 300 comprising an encoding module 101, a controller 103 and an output buffer 160. The MPEG-like encoding system 300 receives and encodes an input information stream IN comprising a plurality of uncompressed information frames, illustratively a sequence of images forming a video information stream, to produce an encoded output information stream OUT.

The encoding module 101 receives and encodes the input information stream IN to produce an encoded information stream S101 that substantially conforms to a group of frames (GOF) or group of pictures (GOP) data structure. The first encoded information stream S101 is buffered in a sub-GOF/GOP buffer 135P and then coupled to the output buffer. The encoded frames stored within the sub-GOF/GOP buffer 135P may be modified by the controller 103, as will be discussed below. The encoding module 101 includes various elements which operate in substantially the same manner as corresponding elements of the first encoding module 101 described above with respect to FIG. 1. As such, only differences in the operation of the various elements will be described in detail below. Specifically, the encoding module 101 comprises an adder 155, a mode decision module 105P, a discrete cosine transform (DCT) module 110P, a quantizer (Q) module 115P, a variable length coding (VLC) module 120P, an inverse quantizer ($Q^{-1}$) 125P, an inverse discrete cosine transform ($DCT^{-1}$) module 130P, a subtractor 156, a buffer 135P, a rate control module 140P, a motion compensation module 145P, a motion estimation module 150P and an anchor frame storage module 170.

The primary difference between the encoding module 101 of FIG. 3 and the first encoding module 101 of FIG. 1 is that the output of the inverse DCT module 130P (i.e., the last anchor frame) is stored in the anchor frame storage module 170 and coupled to the motion estimation module 150P for estimating motion vectors (rather than an unencoded I-frame from the second encoding module of FIG. 1). Additionally, the unencoded version of for each frame that is scheduled, per the GOF/GOP structure to be an I-frame is also stored in the anchor frame storage module 170. Thus, the anchor frame storage module contains the reconstructed anchor frame preceding the last I-frame and the unencoded version of the last I-frame. In this manner, in the case of the I-frame being re-encoded (i.e., a scheduled I-frame encoded as such) as a P-frame, the reconstructed anchor frame preceding the I-frame is used (along with the unencoded version of the I-frame) to predict a P-frame replacement for the encoded I-frame.

Output buffer 160 operates in substantially the same manner as the output buffer 160 of FIG. 1. The output buffer 160 produces a rate control signal RC indicative of a buffer utilization level of a far end decoder buffer. The rate control signal RC is coupled to the encoding module 101, which uses the rate control signal RC to adapt, e.g., quantization parameters such that the bit rate of the output information stream OUT may be controlled, thereby avoiding buffer overflow or underflow in a far end decoder buffer.

Controller 103 produces an encoder control signal C1 for controlling the encoding module 101 and receives at least one of the input information stream IN and a mode decision indication stream MD from the encoding module 101. The controller 103, of FIG. 3 detects information discontinuities in the manner previously described with respect to FIG. 1. While the controller 103 of FIG. 3 also operates in one of a continuous mode and a discontinuous mode, and the end results of the two operating modes are the same (with respect to the GOF/GOP data structure adaptation), the operation of the; controller 103 in these modes is slightly different than the operation of the controller 103 of FIG. 1.

In the continuous mode of operation, the encoding module 101 of FIG. 3 encodes the input information stream IN in the above-described manner to produce an encoded information stream S101. The encoded information stream is stored in a temporary buffer (sub-GOF/GOP buffer 135P) prior to being coupled to the output buffer.

Upon detecting an information discontinuity, the controller 103 enters the discontinuous mode of operation. If it is deemed appropriate to recode the last encoded anchor frame as a P-frame (i.e., the presently scheduled P-frame will be encoded as an I-frame), then the unencoded version of the last encoded anchor frame (presumably an I-frame) is retrieved from the anchor storage module 170 and encoded as a P-frame using the reconstructed anchor frame preceding, temporally, the unencoded version of the unencoded I-frame (also stored in the anchor storage module). Thus, the MPEG-like encoder of FIG. 3 implements an "on demand" re-encoding of a previously encoded I-frame as a P-frame.

Figure 4:
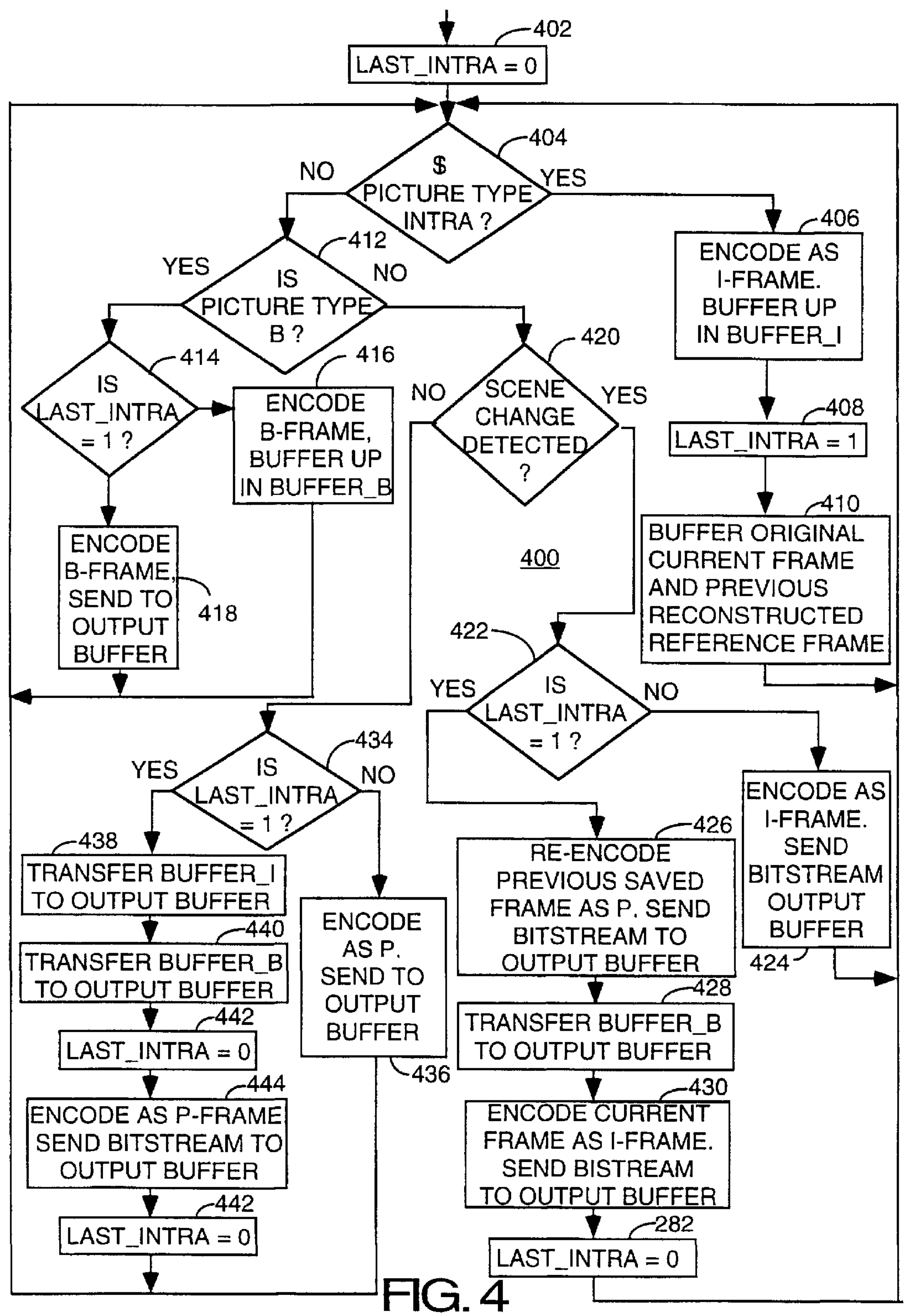
FIG. 4 depicts a flow diagram of an adaptive frame switching routine 400 suitable for use in the MPEG-like encoder depicted in FIG. 3.

FIG. 4 depicts a flow diagram of an adaptive frame switching routine 400 suitable for use in the MPEG-like encoder depicted in FIG. 3. Specifically, the routine 400 of FIG. 4 may be implemented as a control routine within the controller 103, or as a logical function between cooperating modules of the MPEG-like encoder 300 of FIG. 3. The routine 400 provides adaptive fame switching within the context of an encoding system providing demand based encoding of anchor frames as either I-frames or P-frames as necessary.

The routine 400 is entered at step 402, where a variable LAST_INTRA is set equal to 0. The routine 400 then proceeds to step 404, where a query is made as to whether a received information frame is scheduled (per the GOF/GOP data structure) to be encoded as an I-frame. If the query at step 404 is answered affirmatively, then the routine 400 proceeds to step 406, where the received frame is encoded as an I-frame, and the encoded I-frame is stored in a first buffer (i.e., BUFFER_I). The routine 400 then proceeds to step 408, where the variable LAST_INTRA is set equal to 1. The routine 400 then proceeds to step 410, where the received frame and a previously reconstructed reference frame (i.e., an anchor frame) are stored in a non-encoded buffer (e.g., anchor storage module 170). The routine 400 then proceeds to step 404.

If the query at step 404 is answered negatively, then the routine 400 proceeds to step 412, where a query as to whether the received frame is scheduled to be encoded as a B-frame is made. If the query in step 412 is answered affirmatively, then the routine 400 proceeds to step 414, where a query is made as to whether the variable LAST_INTRA is equal to 1. If the query at step 414 is answered affirmatively, then the routine 400 proceeds to step 416, where the received frame is encoded as a B-frame, and the encoded B-frame is stored is a second buffer (i.e., BUFFER_B). The routine 400 then proceeds to step 404. If the query in step 414 is answered negatively, then the routine 400 proceeds to step 418, where the received frame is encoded as a B-frame and the encoded B-frame is sent to the output buffer. The routine 400 then proceeds to step 404.

If the query at step 412 is answered negatively, then the routine 400 proceeds to step 420, where a query is made as to whether an information discontinuity (e.g., a scene change) has been detected.

If the query at step 420 is answered affirmatively, then the routine 400 proceeds to step 422, where a query is made as to whether the variable LAST_INTRA is equal to 1. If the query in step 422 is answered negatively, then the routine 400 proceeds to step 424, where the received frame is encoded as an I-frame, and the encoded I-frame is coupled to the output buffer. The routine 400 then proceeds to step 404.

If the query in step 422 is answered affirmatively, then the routine 400 proceeds to step 426, where the previously saved reference frame is re-encoded as a P-frame, and the encoded P-frame is coupled to the output buffer. The routine 400 then proceeds to step 428, where the contents of the second buffer (i.e., BUFFER_B) are coupled to the output buffer. The routine 400 then proceeds to step 430, where the received frame is encoded as an I-frame, and the encoded I-frame is coupled to the output buffer. The routine 400 then proceeds to step 432, where the variable LAST_INTRA is set equal to 0, and to step 404.

If the query at step 420 is answered negatively, then the routine proceeds to step 434, where a query is made as to whether the variable LAST_INTRA is equal to 1. If the query at step 434 is answered negatively, then the routine 400 proceeds to step 436, where the received frame is encoded as a P-frame, and the encoded P-frame is sent to the output buffer. The routine 400 then proceeds to step 404.

If the query at step 434 is answered affirmatively, then the routine 400 then proceeds to step 438, where the contents of the first buffer (BUFFER_I) are coupled to the output buffer, and to step 440, where the contents of the second buffer (BUFFER_B) are coupled to the output buffer. The routine 400 then proceeds 444, where the received frame is encoded as a P-frame, and the encoded P-frame is coupled to the output buffer. The routine 400 then proceeds to step 446, where the variable LAST_INTRA is set equal to 0, and on to step 404. The adaptive frame switching routine 400 of FIG. 4 accomplishes substantially the same function as the adaptive frame switching routine 200 of FIG. 2, except that the routine 400 of FIG. 4 tends to require more memory resources and less processing resources than the routine 200 of FIG. 2. This is because the routine 400 of FIG. 4 requires the storage of the unencoded (i.e., uncompressed) information frame scheduled to be the first frame of a GOF or GOP and the reconstructed anchor frame prior to it.

Figure 5:
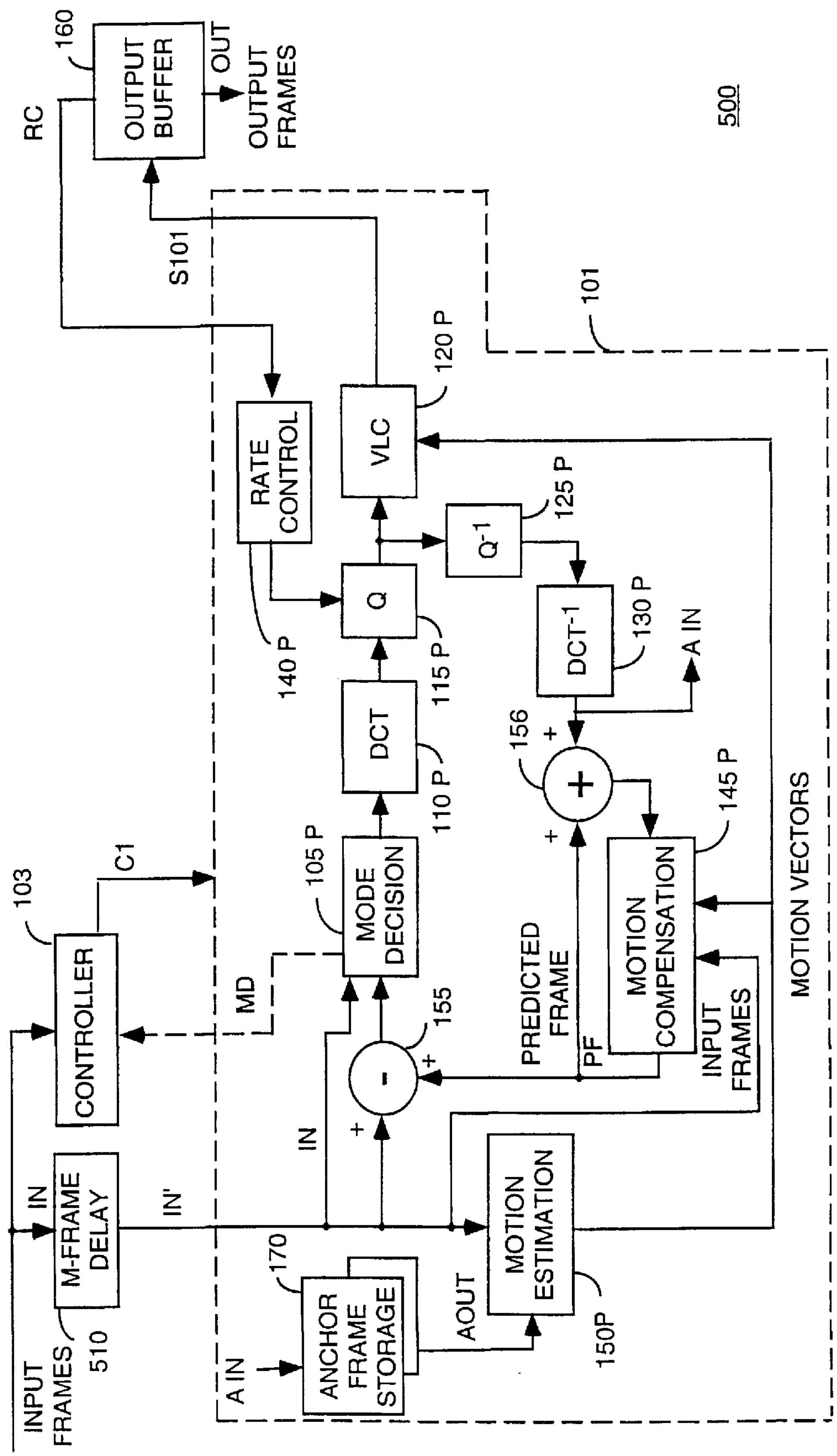
FIG. 5 depicts an embodiment of an MPEG-like encoding system 500 according to the invention.

FIG. 5 depicts an embodiment of an MPEG-like encoding system 500 according to the invention. Specifically, FIG. 5 depicts an MPEG-like encoding system 500 comprising an M-frame delay module 510, an encoding module 101, a controller 103 and an output buffer 160. The MPEG-like encoding system 500 receives and encodes an input information stream IN comprising a plurality of uncompressed information frames, illustratively a sequence of images forming a video information stream, to produce an encoded output information stream OUT. Since the MPEG-like encoding system 500 of FIG. 5 is substantially similar to the MPEG-like encoding system 300 previously described with respect to FIG. 3, only the differences between the two systems will be discussed in detail.

In the MPEG-like encoding system 500 of FIG. 5, the M-frame delay module 510, illustratively a "First In-First Out" (FIFO) buffer, receives the input information stream IN and provides a delayed input information stream IN to the encoder 101. As previously discussed, a GOF/GOP data structure comprises N frames arranged as a plurality of sub-GOF or sub-GOP data structures having a maximal size of M frames. Thus, the M-frame delay module 510 is capable of holding at least one sub-GOF/GOP according to the GOF/GOP data structure.

The encoding module 101 receives and encodes the delayed input information stream IN to produce an encoded information stream S101 that substantially conforms to a group of frames (GOF) or group of pictures (GOP) data structure. The first encoded information stream S101 is coupled to the output buffer 160. The encoding module 101 includes various elements which operate in substantially the same manner as corresponding elements of the first encoding module 101 described above with respect to FIG. 1 and FIG. 3. As such, only differences in the operation of the various elements will be described in detail below. Specifically, the encoding module 101 comprises an adder 155, a mode decision module 105P, a discrete cosine transform (DCT) module 110P, a quantizer (Q) module 115P, a variable length coding (VLC) module 120P, an inverse quantizer ($Q^{-1}$) 125P, an inverse discrete cosine transform ($DCT^{-1}$) module 130P, a subtractor 156, a rate control module 140P, a motion compensation module 145P, a motion estimation module 150P and an anchor frame storage module 170.

The primary difference between the encoding module 101 of FIG. 5 and the encoding module 101 of FIG. 3 is that the encoding module 101 of FIG. 5 does not include a buffer 135 (nor the associated optional rate control signal RC1), as previously depicted in the encoding module 101 of FIG. 3. Additionally, the anchor frame storage module 170 of the encoding module 101 of FIG. 5 does not store the unencoded information frame that is scheduled, per the GOF/GOP structure to be the first frame of a GOF or GOP (i.e., the I-frame), as previously depicted in the encoding module 101 of FIG. 3. Finally, the mode decision module 105P of the encoding module 101 of FIG. 5 does not provide an optional mode decision signal MD1 to the controller, as previously depicted in the encoding module 101 of FIG. 3.

Output buffer 160 operates in substantially the same manner as the output buffer 160 of FIG. 3. The output buffer 160 produces a rate control signal RC indicative of a buffer utilization level of a far end decoder buffer. The rate control signal RC is coupled to the encoding module 101, which uses the rate control signal RC to adapt, e.g., quantization parameters such that the bit rate of the output information stream OUT may be controlled, thereby avoiding buffer overflow or underflow in a far end decoder buffer.

Controller 103 produces an encoder control signal C1 for controlling the encoding module 101. The controller 103 receives at the input information stream IN and detects information discontinuities within that information stream. In response to the detection of an information discontinuity within the (undelayed) input information stream IN, the controller 103 dynamically adapts the GOF/GOP data structure used by the encoder such that an I-frame is not included within both of two consecutive sub-GOF/GOP groups of encoded frames.

To illustrate the operation of the controller 103 of FIG. 5, consider the case of a the input information stream IN providing a sub-GOF/GOP including an information discontinuity to the M-frame delay module 510. The controller 103 monitors the input stream and detects the information discontinuity prior to the encoder 101 receiving the delayed input information stream IN'. The controller 103 causes the encoder 101 to encode, as a P-frame, the anchor frame of the sub-GOF/GOP including the information discontinuity. The controller 103 also causes the encoder 101 to encode, as an I-frame, the first frame following the information discontinuity (e.g., the first video frame of a new scene) or the anchor frame of the next sub-GOF/GOP.

Since the controller 103 examines each sub-GOF/GOP prior to the sub-GOF/GOP being coupled to the encoder 101, the controller 103 is able to determine the most appropriate method of coding the examined sub-GOF/GOP. That is, the controller provides, via control signal C1, information about a next sub-GOF/GOP to be encoded to the rate control module 140P. Thus, the buffer utilization predictions of the rate controller 140P are enhanced, thereby providing enhanced encoding functionality to the encoder 101 (e.g., bit budget safety margins may be reduced, thereby allowing higher quality encoding by allocating more bits to each frame. It should be noted that the effect of an unexpected scene change to a particular sub-GOF/GOP can be spread across the entire GOF or GOP to minimize any quality degradation experienced by the particular sub-GOF/GOP. Moreover, since the last sub-GOF/GOP of a scene is likely to be less important, in terms of preserving visual fidelity, than the first sub-GOF/GOP of a scene, the bits allocated for the last sub-GOF/GOP of a current scene can be reduced, thereby allowing for a corresponding increase in bit allocation to the next sub-GOF/GOP to improve the quality of the I-frame in the new scene.

It is important to note that the encoder 101 of FIG. 5 encodes each anchor frame only once, rather than always twice (per FIG. 1) or sometimes twice (per FIG. 3).

Figure 6:
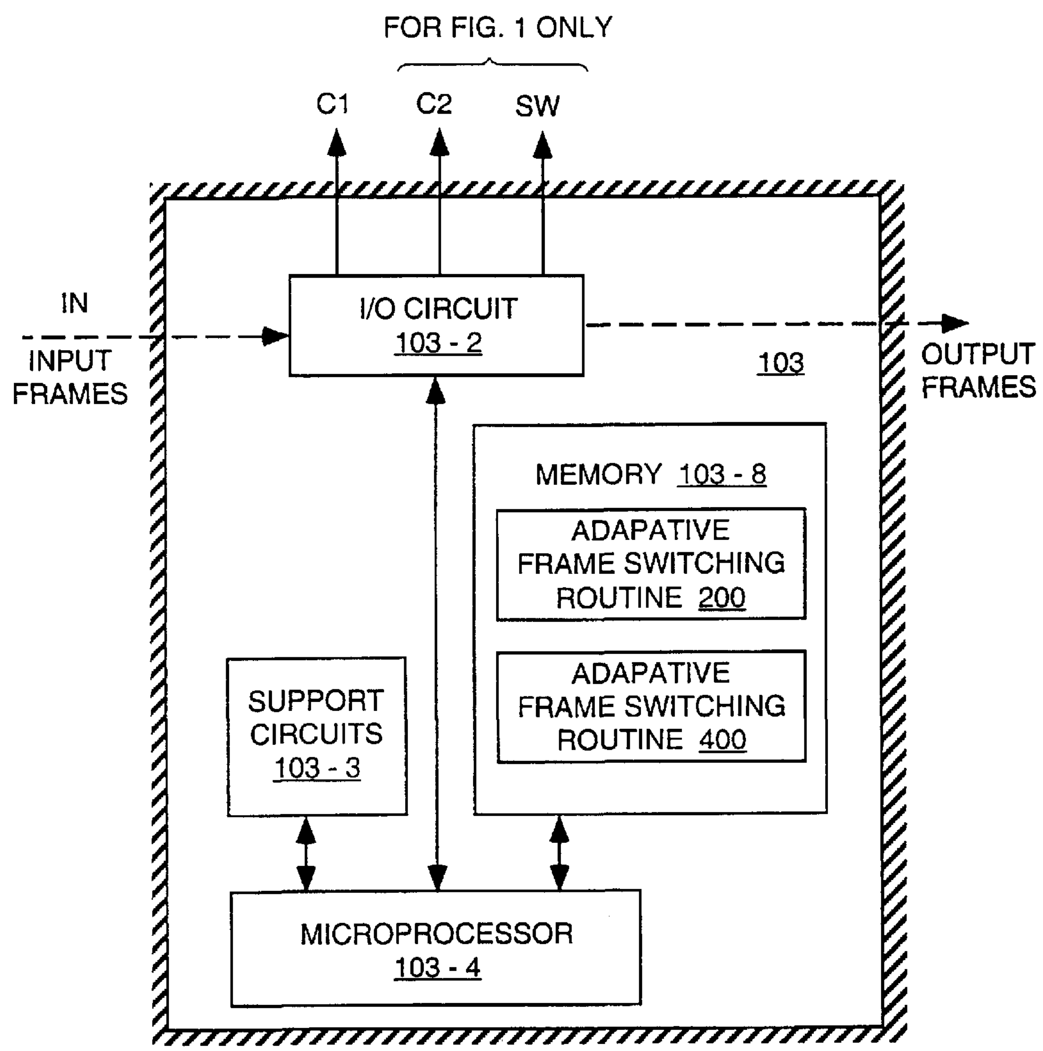
FIG. 6 depicts a controller suitable for use in the MPEG-like encoder depicted in FIG. 1, FIG. 3 or FIG. 5.

FIG. 6 depicts a controller 103 suitable for use in the MPEG-like encoder depicted in either FIG. 1 or FIG. 3. The controller 103 comprises a microprocessor 103-4 as well as memory 103-8 for storing an a simultaneous encoding, adaptive frame switching routine 200 and/or an "on demand" encoding, adaptive frame switching routine 400. The microprocessor 103-4 cooperates with conventional support circuitry 103-6 such as power supplies, clock circuits, cache memory and the like as well as circuits that assist in executing the software routines. As such, it is contemplated that some of the process steps discussed herein as software processes may be implemented within hardware, e.g., as circuitry that cooperates with the microprocessor 103-4 to perform various steps. The controller 103 also contains input/output circuitry 103-2 that forms an interface between the various encoding modules (101 and 102) and the selector (104). Although the controller 103 is depicted as a general purpose computer that is programmed to perform adaptive frame switching and associated control functions in accordance with the present invention, the invention can be implemented in hardware as an application specific integrated circuit (ASIC). As such, the process steps described herein (e.g., with respect to FIG. 2 and FIG. 4) are intended to be broadly interpreted as being equivalently performed by software, hardware, or a combination thereof.

The controller 103 of the present invention may be used to execute the control routines described in FIG. 2 and FIG. 4. However, it must also be noted that the controller 103 may also be used to implement the MPEG-like encoders of FIG. 1, FIG. 3 and FIG. 5 entirely in software. As such, the controller 103 of FIG. 6 is shown receiving the input information stream IN and produce the output information stream OUT. In such a software implementation, the controller 103 performs the functions described above with respect to the MPEG-like encoders of FIG. 1, FIG. 3 and/or FIG. 5.

It should be noted that the buffer 135P of the encoder 101 of, e.g., FIG. 3, may store encoded frames in a "linked list" manner. That is, each of the stored encoded frames may be associated with a pointer variable that identifies, e.g., the next encoded frame in a sequence of encoded frames. In this manner, selecting an I-frame instead of P-frame for inclusion in the encoder output stream S101 comprises "de-linking" the de-selected frame and "linking" the selected frame. That is, the pointer of the encoded frame preceding the de-linked frame is made to point to the linked frame. Similarly, the pointer associated with the linked frame is made to point to the frame following the de-linked frame.

The invention advantageously utilizes the bit budget of a GOF/GOP structure such that the bit budget is not "wasted" on intra-coding a last sub-GOF/GOP in an information stream. Moreover, the invention operates to substantially prevent decoder buffer overflow conditions caused by tightly spaced intra-coded information frames (e.g., two consecutive I-frames). Moreover, it is noted that informational qualities, such as visual information qualities, of the dual-coded information frame are assumed to be nearly identical for both the I-frame and the P-frame are. Thus, in addition to a GOF/GOP quality enhancement, there is no discernable information degradations imparted to any individual frame within the GOF/GOPs effected by the operation of the invention.

The present invention can be embodied in the form of computer-implemented processes and apparatuses for practicing those processes. The present invention also can be embodied in the form of computer program code embodied in tangible media, such as floppy diskettes, CD-ROMs, hard drives, or any other computer readable storage medium, wherein, when the computer program code is loaded into and executed by a computer, the computer becomes an apparatus for practicing the invention. The present invention can also be embodied in the form of computer program code, for example whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Although various embodiments which incorporate the teachings of the present invention have been shown and described in detail herein, those skilled in the art can readily devise many other varied embodiments that still incorporate these teachings.

What is claimed is:

1. A method for compression coding a sequence of unencoded information frames to produce a sequence of encoded information frames substantially in accordance with a group of frames (GOF) information structure comprising an I-frame followed by additional frames including a first P-frame, said method comprising the steps of:

adapting, in response to an inter-frame information discontinuity within said sequence of unencoded information frames occurring between an unencoded information frame normally encoded as an I-frame and a subsequent unencoded information frame normally encoded as a P-frame, said GOF information structure such that said unencoded information frame normally encoded as an I-frame is encoded as a P-frame and said subsequent unencoded information frame normally encoded as a P-frame is encoded as an I-frame.

2. The method of claim 1, wherein said step of adapting comprises the steps of:

encoding, as both an I-frame and a P-frame, each unencoded information frame scheduled to be an anchor frame according to the GOF information structure; and selecting, for each encoded anchor frame to be included in said produced sequence of encoded information frames, a respective one of said encoded I-frame and said encoded P-frame associated with said anchor frame; wherein:

in the presence of an information discontinuity, the I-frame associated with said first anchor frame following said information discontinuity is selected, and the P-frame associated with said first anchor frame preceding said information discontinuity is selected.

3. The method of claim 2, wherein:

in the absence of an information discontinuity, said selected one of said encoded I-frame and said encoded P-frame associated with said anchor frame is determined according to said GOF information structure frames.

4. The method of claim 2, wherein:

said inter-frame information discontinuity comprises an indicium of a macroblock intra-coding to inter-coding ratio beyond a threshold level.

5. The method of claim 2, wherein said sequence of information frames comprise a sequence of video information frames, and said information discontinuity comprises a scene change.

6. The method of claim 1, wherein said step of adapting comprises the steps of:

encoding, as both an I-frame and a P-frame, each unencoded information frame scheduled to be encoded as a P-frame according to the GOF information structure; and selecting, for each encoded P-frame scheduled to be included in said produced sequence of encoded information frames, a respective one of said encoded P-frame said associated encoded I-frame; wherein:

in the presence of an information discontinuity, the I-frame associated with said first anchor frame following said information discontinuity is selected, and the: P-frame associated with said first anchor frame preceding said information discontinuity is selected.

7. The method of claim 6, wherein:

in the absence of an information discontinuity, said selected one of said encoded I-frame and said encoded P-frame associated with said anchor frame is determined according to said GOF information structure frames.

8. The method of claim 6, wherein:

said inter-frame information discontinuity comprises an indicium of a macroblock intra-coding to inter-coding ratio beyond a threshold level.

9. The method of claim 6, wherein said sequence of information frames comprise a sequence of video information frames, and said information discontinuity comprises a scene change.

10. The method of claim 1, wherein said step of adapting comprises the steps of:

storing each unencoded information frame scheduled to be I-frame according to the GOF information structure;

encoding, according to the GOF information structure, each anchor frame as either an I-frame or a P-frame; and in the case of an information discontinuity being absent: selecting each of said encoded anchor frames for inclusion in said produced sequence of encoded information frames;

in the case of an information discontinuity being present: encoding, as a P-frame predicted using said stored unencoded information frame, and selecting for inclusion in said produced sequence of encoded information frames said first anchor frame preceding said information discontinuity; and encoding, as an I-frame, and selecting for inclusion in said produced sequence of encoded information frames said first anchor frame following said information discontinuity.

11. The method of claim 1, further comprising the step of:

delaying each sub-GOF of said sequence of unencoded information frames; wherein:

said step of adapting comprises the steps of redefining said GOF structure in response to said information discontinuity prior to encoding said sequence of unencoded information frames.

12. In a system for compression coding a sequence of information frames to produce a sequence of encoded information frames according to a group of frames (GOF) information structure, where each GOF comprises at least one sub-GOF, where each sub-GOF comprises an anchor frame and one or more non-anchor frames, said non-anchor frames including prediction information based on said anchor frame, a method comprising the steps of:

encoding, using a first encoding module, a sub-GOF portion of said sequence of information frames according to said GOF information structure to produce a sequence of encoded information frames, wherein each of said anchor frames comprises an I-frame or a P-frame;

encoding, using a second encoding module, said sub-GOF portion of said sequence of information frames according to said GOF structure to produce a sequence of encoded information frames, wherein each of said anchor frames comprises a P-frame;

determining if an information discontinuity exists within said sub-GOF portion of said sequence of information frames; and in the case of an information discontinuity existing in said sub-GOF portion of said sequence of information frames, coupling to an output said sequence of encoded information frames produced by said second encoding module; and in the case of an information discontinuity not existing in said sub-GOF portion of said sequence of information frames, coupling to said output said sequence of encoded information frames produced by said first encoding module.

13. The method of claim 12, wherein said sequence of information frames comprise a sequence of video information frames, and said information discontinuity comprises a scene change.

14. The method of claim 12, wherein:

if said sequence of encoded information frames produced by said first encoding module includes an I-frame, then said sequence of encoded information frames produced by said first encoding module is coupled to said output.

15. Apparatus for use in a system for compression coding a sequence of information frames to produce a sequence of encoded information frames according to a group of frames (GOF) information structure, where each GOF comprises at least one sub-GOF, where each sub-GOF comprises an anchor frame and one or more non-anchor frames, said non-anchor frames including prediction information based on said anchor frame, said apparatus comprising:

a first encoding module, for encoding said sequence of information frames according to said GOF information structure to produce a sequence of encoded information frames, wherein each of said anchor frames comprises an I-frame or a P-frame;

a first buffer, for storing a sub-GOF produced by said first encoding module;

a second encoding module, for encoding said sequence of information frames according to said GOF structure to produce a sequence of encoded information frames, wherein each of said anchor frames comprises a P-frame;

a second buffer, for storing a sub-GOF produced by said second encoding module; wherein in a first mode of operation, said sub-GOF stored in said first buffer is coupled to an output; and in a second mode of operation, said sub-GOF stored in said second buffer is coupled to said output.

16. The apparatus of claim 15, wherein said second mode of operation is entered in response to indicia of an information discontinuity in said sequence of information frames.

17. The apparatus of claim 16, wherein said sequence of information frames comprise a sequence of video information frames, and said information discontinuity comprises a scene change.

18. The apparatus of claim 16, wherein said second mode of operation is only entered if said anchor frame of said GOF stored in said first buffer comprises a P-frame.

19. An apparatus comprising:

a first encoder, for compression coding a sequence of unencoded information frames to produce a sequence of encoded information frames substantially in accordance with a group of frames (GOF) information structure, and a controller, for controlling said encoder in response to indicia of an inter-frame information discontinuity occurring between an unencoded information frame normally encoded as an I-frame and a subsequent unencoded information frame normally encoded as a P-frame within said sequence of unencoded information frames, said controller adapting said GOF information structure such that said unencoded information frame normally encoded as an I-frame is encoded as a P-frame and said subsequent unencoded information frame normally encoded as a P-frame is encoded as an I-frame.

20. The apparatus of claim 19, further comprising:

a second encoder, for encoding as an I-frame those frames scheduled to be encoded as P-frames per a group of frames (GOF) information structure; and a selector, responsive to said controller for coupling to an output said sequence of encoded information frames produced by said first encoder or said encoded I-frames produced by said second encoder;

said controller, in response to said indicia of an inter-frame information discontinuity within said sequence of unencoded information frames, causing said selector to select for output an I-frame associated with said first anchor frame following said information discontinuity and a P-frame associated with said first anchor frame preceding said information discontinuity.

21. The apparatus of claim 20, wherein:

in the absence of an information discontinuity, said selected one of said encoded I-frame and said encoded P-frame associated with said anchor frame is determined according to said GOF information structure frames.

22. The apparatus of claim 19, further comprising:

a memory, for storing each unencoded information frame scheduled to be encoded as an I-frame per said GOF information structure, and for storing a reconstructed anchor frame temporally preceding said scheduled I-frame;

said controller, in the case of said information discontinuity being present, causing said first encoder to re-encode said I-frame as a P-frame.

23. The apparatus of claim 19, further comprising:

a buffer, for delaying each sub-GOF of said sequence of unencoded information frames; wherein:

said controller examines said sequence of unencoded information frames coupled to an input of said buffer and, if said examined information frames include an information discontinuity, said controller modifies said GOF structure utilized by said first encoder.

* * * * *

UNITED STATES PATENT AND TRADEMARK OFFICE

CERTIFICATE OF CORRECTION

PATENT NO. : 6,563,549 B1
DATED : May 13, 2003
INVENTOR(S) : Sriram Sethuraman

It is certified that error appears in the above-identified patent and that said Letters Patent is hereby corrected as shown below:

Column 19,
Line 49, please change "the: P-frame" to -- the P-frame --.

Column 21,
Line 3, please delete the phrase "for use in a system".

Signed and Sealed this

Thirtieth Day of December, 2003

JAMES E. ROGAN
*Director of the United States Patent and Trademark Office*